United States Patent [19]

Labrecque

[11] 4,010,232

[45] Mar. 1, 1977

[54] METHOD OF MAKING A COMPOSITE URETHANE FOAM AND CONCRETE CONSTRUCTION PANEL

[76] Inventor: Roger Labrecque, 4667 Garnier St., Montreal, Quebec, Canada

[22] Filed: Sept. 11, 1974

[21] Appl. No.: 505,039

[52] U.S. Cl. .......................... 264/46.4; 52/309.12; 52/609; 264/333; 264/DIG. 57; 428/310
[51] Int. Cl.$^2$ ..................................... B29D 27/04
[58] Field of Search .... 264/45.8, 50, 257, DIG. 57, 264/333, 46.4; 52/609, 309; 428/310

[56] References Cited

UNITED STATES PATENTS

| 531,842 | 1/1895 | Haddock | 264/256 |
|---|---|---|---|
| 3,013,996 | 12/1961 | Pollard et al. | 264/50 |
| 3,270,113 | 8/1966 | Longinotti | 264/256 X |
| 3,419,454 | 12/1968 | Hoffman | 264/256 X |
| 3,439,076 | 4/1969 | Loois | 264/256 X |
| 3,555,131 | 12/1971 | Weismann | 264/45.8 X |
| 3,629,384 | 12/1971 | Elgenstierna | 264/46.5 X |

FOREIGN PATENTS OR APPLICATIONS

| 910,631 | 11/1962 | United Kingdom | 264/256 |
|---|---|---|---|

OTHER PUBLICATIONS

Bender; Rene J., "Handbook of Foamed Plastics", Libertyville, Ill., Lake Publishing Corp., c. 1965, pp. 125–141.
"Design and Control of Concrete Mixtures" Eighth Edition, Chicago, Ill. Portland Cement Association, [N 1945].
Lea; F. M. "The Chemistry of Cement and Concrete" Third Edition, Glasgow, Scotland, Edward Arnold, c. 1970, pp. 531–532.

*Primary Examiner*—Philip Anderson
*Attorney, Agent, or Firm*—Burns, Doane, Swecker & Mathis

[57] ABSTRACT

A construction panel and a method of making the same wherein a layer of concrete is bound to a layer of urethane or polyurethane through a blanket of dry cement mixture and the in situ setting into a mold of a wet cement mixture and an unset foaming plastic composition. The latter includes urethane or polyurethane, a catalyst, and a blowing agent, the dry cement mixture includes white cement, silica, a coloring agent, and an aggregate, and the concrete is formed from the same dry cement mixture with water.

2 Claims, No Drawings

METHOD OF MAKING A COMPOSITE URETHANE FOAM AND CONCRETE CONSTRUCTION PANEL

This invention relates to a method of making a construction panel, and more particularly, a construction panel formed of mutually adherent layers.

The urethane foams have well known fireresistant and insulation properties which makes them well suited for use in the construction field. However, up to now, such application of these foams has been severely limited by the difficulty of successfully cementing a layer of such foam to a harder layer made of a cement mixture.

It is a general object of the invention to provide a method of making a construction panel including a layer of urethane which is successfully adhered to a layer made of a cement mixture.

The invention will now be described in details with reference to a method of making a construction panel according to a preferred embodiment.

The method of making the construction panel includes forming a dry cement mixture by mixing cement, silica and an aggregate with preferably a coloring agent to obtain a concrete of the desired color. Preferably, the cement is a white cement, the silica is of 70-mesh, and the aggregate is expanded mica, such as the heat expanded mica known under the registered trade mark "ZONOLITE", owned by W. R. Grace Co.

Some of the dry cement mixture is mixed with water to form a wet cement mixture which is spread into a layer in a mold. Some dry cement is thereafter powdered onto the wet cement mixture until a dry blanket is formed onto the latter. As soon as such dry blanket has been obtained, an unset foaming urethane formulation in liquid form is poured onto the dry cement blanket and the mold is closed by a cover. The setting operation is started at room temperature that is some 70° F Fahrenheit, no heating being required. When the foaming urethane formulation has set into a foam urethane layer, the construction panel is removed from the mold to allow the cement mixture to complete its setting into a concrete layer. The urethane formulation upon reacting in the mold, expands and develops heat and pressure whereby the wet cement mixture is heated and the resulting urethane layer is pressed against the cement layer. Water in the wet cement layer migrates into and wets the dry blanket whereby the latter turns into concrete. This water migration takes place in the closed mold where it is helped by the pressure and heat conditions therein. A firm bond is thus produced between the concrete layer and the foam urethane layer. The mold may be vibrated to pack the wet cement mixture into a compact layer before setting.

EXAMPLE

The following dry cement mixture was prepared:
1 pound of white cement, about 24% by weight
3 pounds of silica 70-mesh, about 73% by weight
1 ounce of coloring agent, about 1.5% by weight
1 ounce of Zonolite aggregate, about 1.5% by weight.

The following wet cement mixture was prepared: by adding 40 ounces of water to the above dry cement mixture giving then by weight about 38% water, 15% white cement, 45% silica, 1% coloring agent, and 1% Zonolite aggregate. The wet cement mixture was spread in the bottom of the mold then dry cement mixture was sprinkled over the wet cement mixture just enough to form a dry blanket. Then a liquid urethane formulation was poured over the dry blanket and the mold was closed.

During the setting in the mold, the temperature inside the mold reached 180° Fahrenheit. The setting of the foaming urethane composition took only 30 seconds after which the mold was opened to remove the panel therefrom.

The foaming urethane formulation was the result of the isocyanate with a dark liquid containing thorough mixing of a clear liquid containing polyol, a suitable catalyst and a blowing agent in liquid form all in accordance with the conventional one-shot technique.

It is very important to ensure that the cement blanket between the wet cement mixture and the foaming plastic composition prevent the ingress of water or moisture into the latter during the foaming action to allow the latter to take place.

The construction panel thus formed includes a layer of concrete bound to a layer of foamed urethane.

The layer of concrete may for instance be ⅛ inch thick while the layer of foamed urethane may be ¾ inch thick with at least one edge of the latter extending laterally from the corresponding edges of the harder layer of concrete to allow nailing through that one edge.

The construction panel may be used to produce floor surfaces, ceilings, as well as exterior and interior wall finishing panels or tiles.

What I claimed is:

1. A method of making a construction panel comprising the steps of:
    spreading a layer of wet cement mixture into a mold;
    powdering dry cement mixture onto said wet cement mixture until a dry blanket of said dry cement mixture is formed on said wet cement mixture;
    pouring a foamable urethane reaction mixture onto said dry blanket;
    closing a cover of said mold;
    allowing said foamable urethane reaction mixture to foam into a urethane foam while the ingress of moisture from said wet cement mixture into said foaming reaction urethane mixture is prevented by said dry cement mixture into which said moisture migrates;
    opening said cover after setting of the urethane foam; and
    removing a panel of bonded urethane and cement from the mold and allowing the cement to dry outside of said mold.

2. A method as defined in claim 1, further including forming the dry cement mixture of cement, silica, and an aggregate and the wet cement mixture as the dry cement mixture with the addition of water.

* * * * *